(12) United States Patent
Sato

(10) Patent No.: US 8,411,280 B2
(45) Date of Patent: Apr. 2, 2013

(54) SURFACE SHAPE MEASUREMENT APPARATUS

(75) Inventor: Ryuichi Sato, Sendai (JP)

(73) Assignee: Canon Kabushiki Kaisha (JP)

( * ) Notice: Subject to any disclaimer, the term of this patent is extended or adjusted under 35 U.S.C. 154(b) by 131 days.

(21) Appl. No.: 12/891,736

(22) Filed: Sep. 27, 2010

(65) Prior Publication Data

US 2011/0080593 A1 Apr. 7, 2011

(30) Foreign Application Priority Data

Oct. 1, 2009 (JP) .................................. 2009-229993
Mar. 31, 2010 (JP) .................................. 2010-083402

(51) Int. Cl.
   *G01B 11/02* (2006.01)
   *G01B 11/30* (2006.01)
(52) U.S. Cl. ........ 356/512; 356/601; 356/606; 356/607; 356/608
(58) Field of Classification Search .................. 356/600, 356/601, 606–608
See application file for complete search history.

(56) References Cited

U.S. PATENT DOCUMENTS

| | | | |
|---|---|---|---|
| 5,003,166 A | | 3/1991 | Girod |
| 5,004,346 A | * | 4/1991 | Kühel ........................... 356/513 |
| 5,625,454 A | | 4/1997 | Huang et al. |
| 7,859,683 B2 | | 12/2010 | Ko et al. |
| 2006/0114475 A1 | * | 6/2006 | De Groot et al. ............. 356/497 |
| 2007/0247639 A1 | | 10/2007 | Amstel et al. |
| 2008/0317334 A1 | | 12/2008 | Hausler |

FOREIGN PATENT DOCUMENTS

| | | |
|---|---|---|
| JP | 2764630 B2 | 6/1998 |
| JP | 2002-116010 A | 4/2002 |
| JP | 3474448 B2 | 12/2003 |
| WO | 03/001143 A2 | 1/2003 |
| WO | 03/006920 A1 | 1/2003 |

OTHER PUBLICATIONS

Sato, Ryuichi. "Surface Shape Measurement Apparatus," Specification and Drawings of unpublished related co-pending U.S. Appl. No. 12/891,648, filed Sep. 27, 2010, pp. 1-33.

(Continued)

*Primary Examiner* — Gregory J Toatley
*Assistant Examiner* — Hina F Ayub
(74) *Attorney, Agent, or Firm* — Rossi, Kimms & McDowell LLP

(57) ABSTRACT

An apparatus for measuring a shape of a surface, comprises a measurement head which measures at least one of a distance between a reference point and the surface and a direction of a normal from the surface to the reference point, a scanning mechanism which scans the measurement head, and a processor which calculates the shape of the surface based on a measurement result measured using the measurement head and coordinates of the reference point, wherein the coordinates of the reference point are calibrated using a measurement result measured by scanning the measurement head along a scanning path in association with a first surface to be measured, and a shape of a second surface to be measured is calculated based on a measurement result measured by scanning the measurement head along the same scanning path in association with the second surface, and the calibrated coordinates of the reference point.

9 Claims, 8 Drawing Sheets

OTHER PUBLICATIONS

Sato, Ryuichi. "Surface Shape Measurement Apparatus," Specification and Drawings of unpublished related co-pending U.S. Appl. No. 12/891,671, filed Sep. 27, 2010, pp. 1-29.

Search Report issued on Jan. 10, 2011 for European Patent Application No. 10180668.5-2213, which is a counterpart application of related co-pending U.S. Appl. No. 12/891,648.

Search Report dated Jan. 10, 2011, issued for corresponding European Patent Application No. 10180680.0-2213.

Search Report dated Jan. 10, 2011, issued for European Patent Application No. 10180678.4-2213, which is a counterpart application of related co-pending U.S. Appl. No. 12/891,671.

* cited by examiner

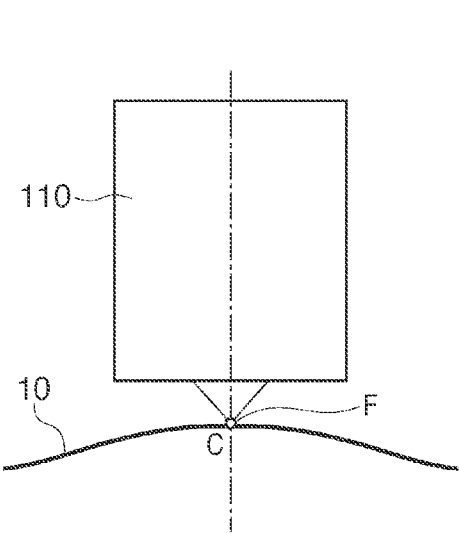
FIG. 7A
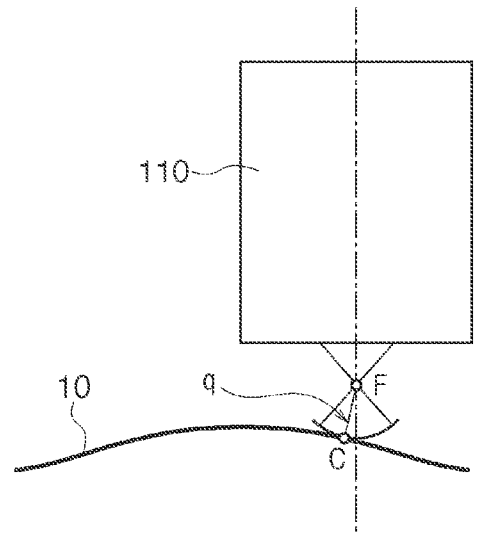
FIG. 7B
FIG. 8
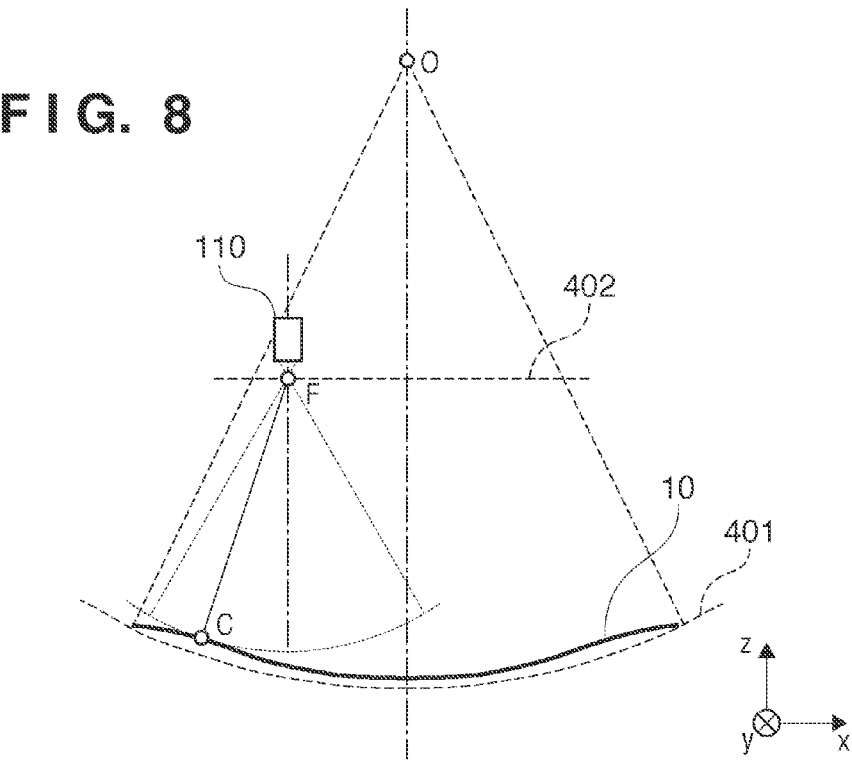

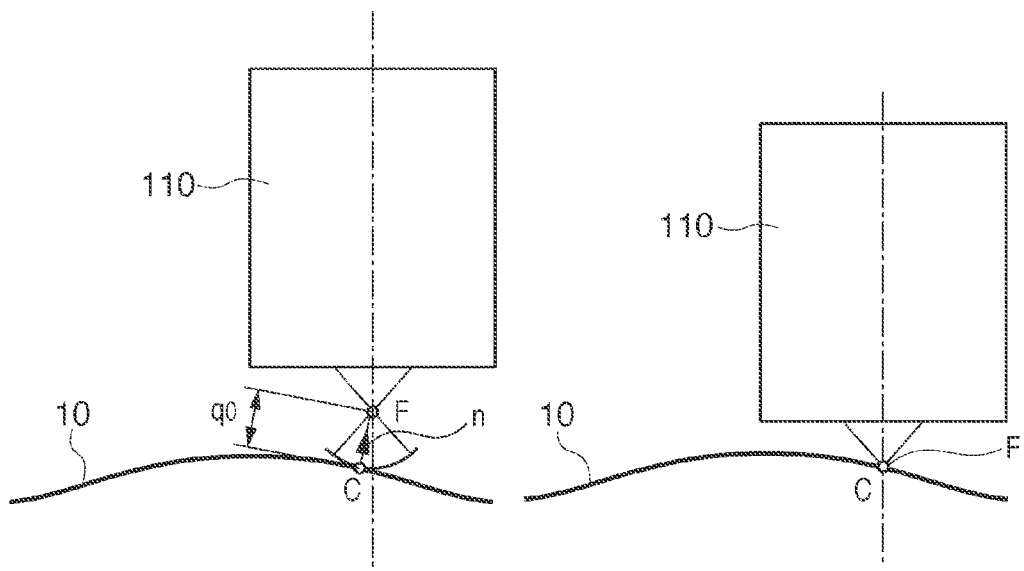
FIG. 11A  FIG. 11B
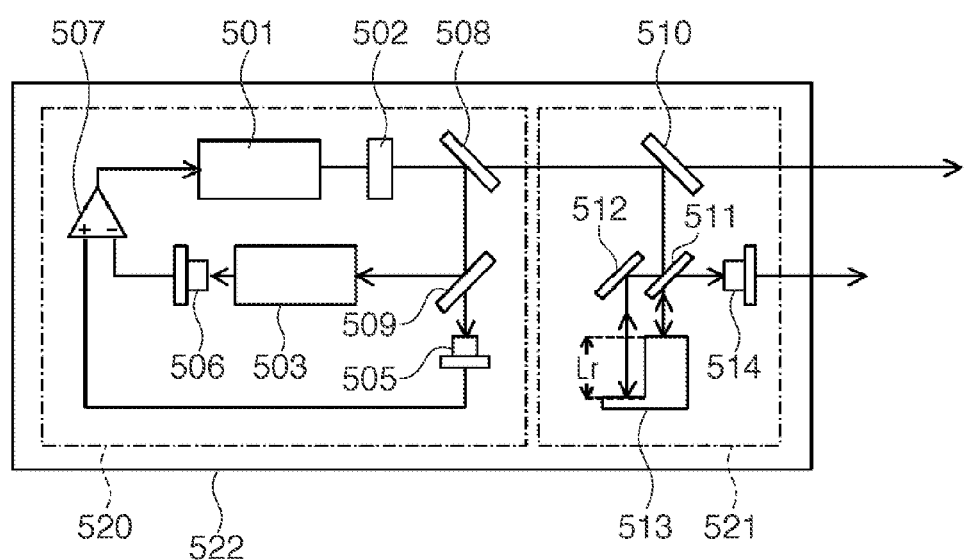
FIG. 12

SURFACE SHAPE MEASUREMENT APPARATUS

BACKGROUND OF THE INVENTION

1. Field of the Invention

The present invention relates to a surface shape measurement apparatus for measuring a shape of a surface to be measured.

2. Description of the Related Art

As a representative method of measuring a surface shape of a spherical lens or aspherical lens, a method of scanning by tracking a surface to be measured using a probe is known. As a typical method, a probe attached to a 3-axis orthogonal stage having X-, Y-, and Z-axis stages is scanned so that the distance between the probe and a surface to be measured becomes constant. By sequentially measuring the positions of the probe on this scanned surface using, for example, a laser distance measuring device, the shape of the surface to be measured can be obtained as a three-dimensional coordinate point group.

In the method of measuring the shape by scanning or tracking the surface to be measured using the probe, it becomes important to calibrate a coordinate system so as to guarantee high measurement precision. As a calibration method of the coordinate system, a method of comparing measured data obtained by measuring a reference surface (masterpiece) and reference data and minimizing their difference is generally used. Japanese Patent No. 3474448 discloses a method of calibrating a coordinate system using a reference spherical surface as a reference surface. With this method, using the fact that when the degree of orthogonality of the coordinate system is inaccurate, the spherical surface is measured as an elliptical surface, errors of the degrees of coordinates orthogonality of the coordinate system are calibrated so that the measured elliptical surface becomes a spherical surface.

In the method of calibrating the coordinate system using the reference surface, when a difference between the shape of the surface to be measured and that of the reference surface becomes large, the measurement precision lowers. This is because a moving region of the probe upon measuring the reference surface is different from that upon measuring the surface to be measured since the probe is used to contour-scan the surface to be measured. In general, the degrees of coordinates orthogonality between partial regions in a measurable region of a shape measuring device are different on an order of sub parts per million (ppm). For this reason, due to the different moving regions of the probe, a shape suffers shape errors on submicron to nanometer orders, which cannot be ignored in high-precision shape measurement.

SUMMARY OF THE INVENTION

One aspect of the present invention provides a surface shape measurement apparatus advantageous in high-precision surface shape measurement.

One aspect of the present invention provides an apparatus for measuring a shape of a surface to be measured, comprising a measurement head which measures at least one of a distance between a reference point and the surface and a direction of a normal from the surface to the reference point by emitting light that passes through the reference point, and detecting test light that is reflected by the surface and returns to the reference point, a scanning mechanism which scans the measurement head, and a processor which calculates the shape of the surface based on a measurement result measured using the measurement head and coordinates of the reference point, wherein the coordinates of the reference point are calibrated using a measurement result measured by scanning the measurement head along a scanning path in association with a first surface to be measured, and a shape of a second surface to be measured, which is different from the first surface, is calculated based on a measurement result measured by scanning the measurement head along the same scanning path as the scanning path for the first surface in association with the second surface, and the calibrated coordinates of the reference point.

Further features of the present invention will become apparent from the following description of exemplary embodiments with reference to the attached drawings.

BRIEF DESCRIPTION OF THE DRAWINGS

FIGS. 7A and 7B are views for explaining a method of deciding a reference required to calculate a distance from the measurement head;

FIG. 8 is a view showing another embodiment of the present invention;

FIGS. 11A and 11B are views for explaining a method of deciding an initial value of a distance between the measurement head and a surface to be measured; and FIG. 12 is a view showing an arrangement for absolute distance measurement.

DESCRIPTION OF THE EMBODIMENTS

A shape measurement apparatus according to the present invention is suited to measuring surface shapes of smoothly continuous objects such as lenses, mirrors, and molds used in, for example, a camera (including a video camera), copying machine, telescope, and exposure apparatus.

Figure 3:
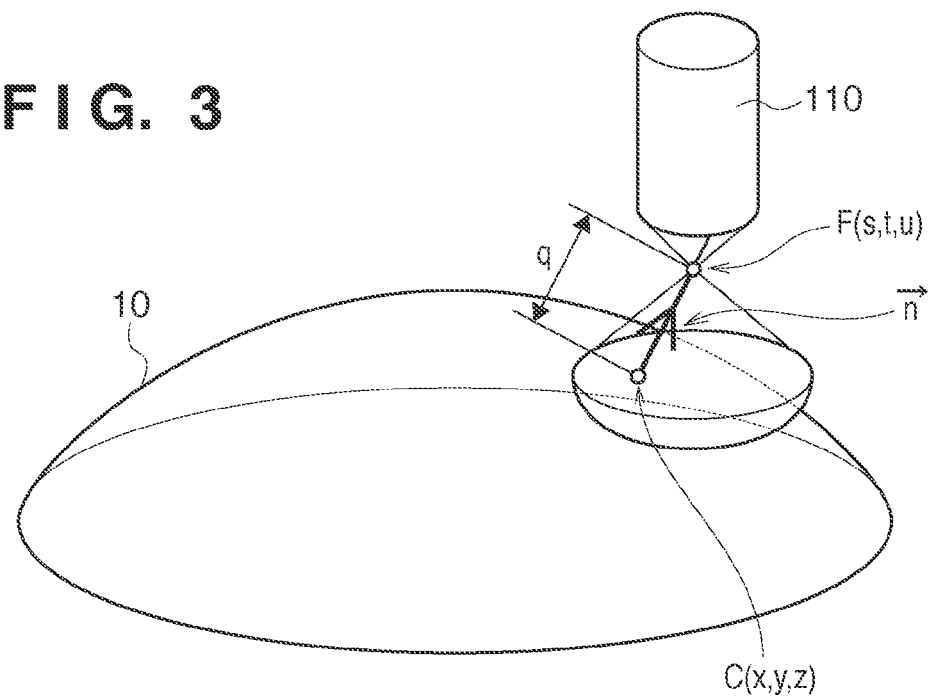
FIG. 3 is a schematic view showing the arrangement of the surface shape measurement apparatus according to the embodiment of the present invention.

The basic principle of the surface shape measurement apparatus according to the present invention will be described first. FIG. 3 shows related parameters. The surface shape measurement apparatus has a measurement head 110 required to measure a surface shape of a surface 10 to be measured. A point F(s, t, u) represents coordinates of a center of a spherical wave emitted from the measurement head 110, that is, a reference point. A point C(x, y, z) represents coordinates of a point where the spherical wave having the point F(s, t, u) as the center is reflected by the surface 10, and returns to the point F. This means the point C represents a point where the spherical wave having the point F as the center is reflected by the surface 10 in the normal direction. Reference symbol q denotes a distance between the point C(x, y, z) and point F(s, t, u). n=(α, β, γ) is a unit normal vector at the point C(x, y, z) of the surface 10. The surface shape measurement apparatus measures the coordinates of the point F(s, t, u) and the distance q while scanning the measurement head 110, and decides a coordinate group of the points C(x, y, z), that is, a surface shape on the surface 10 based on the measurement result.

Since the point C(x, y, z) is located on a spherical surface having the point F(s, t, u) as the center and a radius q, we have:

$$(x-s)^2+(y-t)^2+(z-u)^2=q^2 \quad (1)$$

Partial differentiations of both the sides of equation (1) yield:

$$x=s-q\partial q/\partial s$$
$$y=t-q\partial q/\partial t$$
$$z=u-q\partial q/\partial u \quad (2)$$

Therefore, by measuring the reference point position F(s, t, u) of the measurement head 110, and the distance q from the point F(s, t, u) to the surface 10, a coordinate group of points on the surface 10, that is, the surface shape of the surface 10 can be calculated according to equations (2). The present invention adopts this as the basic principle.

According to a property of the unit normal vector, since α=∂q/∂s, β=∂q/∂t, and γ=∂q/∂u, equations (2) can be expressed in a vector format like:

$$(xyz)=(stu)-q(\alpha\beta\gamma) \quad (3)$$

$$(\alpha\beta\gamma)=(\partial q/\partial s\,\partial q/\partial t\,\partial q/\partial u) \quad (4)$$

Using equation (4), a unit normal vector (α, β, γ) can be obtained from the reference point position F(s, t, u) of the measurement head 110 and the perpendicular distance q from the point F to the surface 10. Substituting this unit normal vector in equation (3) can yield a shape (x, y, z) of the surface to be measured. The basic principle has been described.

On the other hand, equation (4) demonstrates that the perpendicular distance q is obtained from the reference point position F(s, t, u) of the measurement head 110 and the unit normal vector (α β γ) from the surface to be measured toward the reference point F, and the shape can also be obtained by substituting that distance into equation (3).

Therefore, as will be described in the second embodiment, the measurement head may measure the reference point position F(s, t, u) and the unit normal vector (α β γ) from the surface to be measured toward the reference point F.

In processing of discrete measurement data, since partial differentials are handled as differences, equation (5) as a difference format equivalent to equation (4) is applied.

$$(\Delta s \quad \Delta t \quad \Delta u)\begin{pmatrix}\alpha\\\beta\\\gamma\end{pmatrix}=\Delta q \quad (5)$$

(First Embodiment)

Figure 1A:
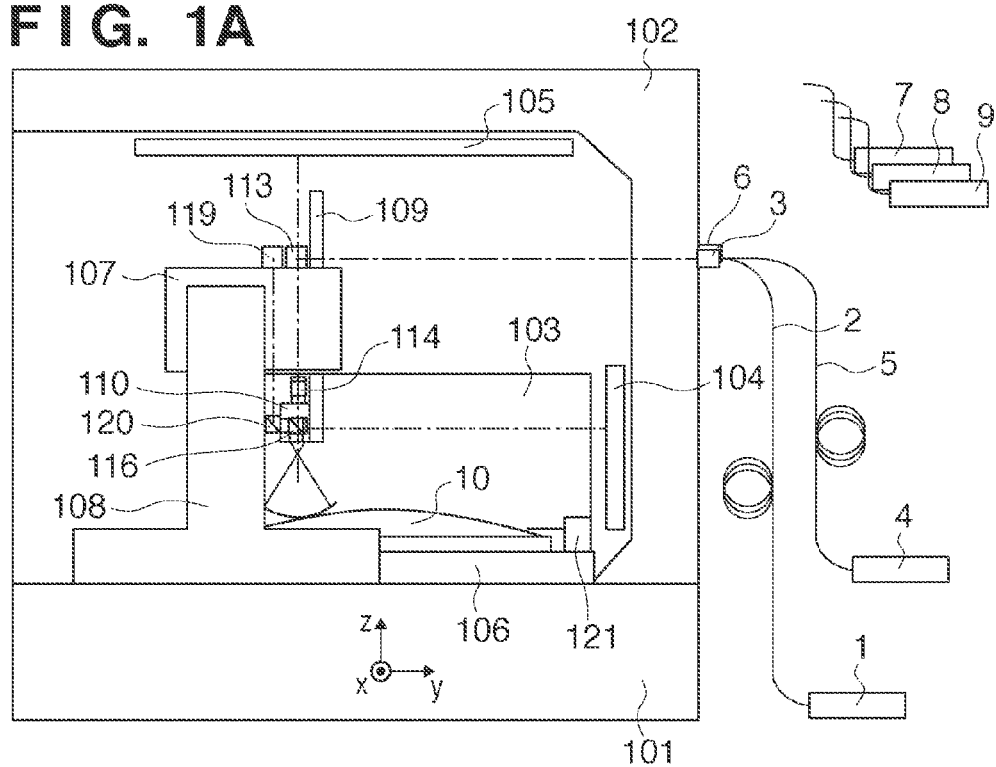
FIGS. 1A and 1B are schematic views showing the arrangement of a surface shape measurement apparatus according to an embodiment of the present invention.
Figure 1B:
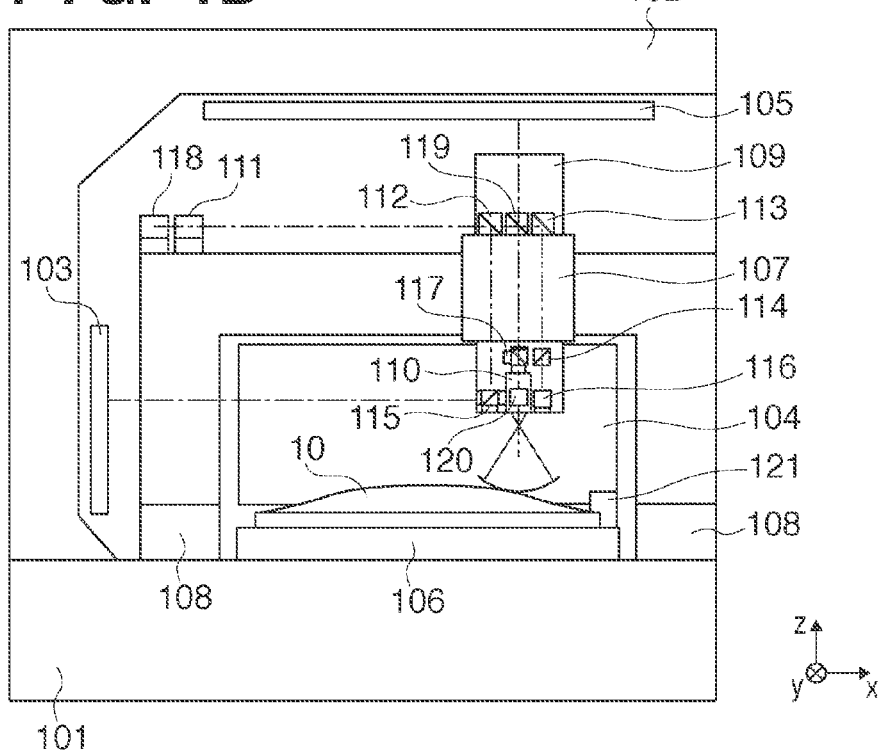

FIGS. 1A and 1B are schematic views showing the arrangement of a surface shape measurement apparatus according to the first embodiment of the present invention. FIG. 1A is a front view, and FIG. 1B is a side view. In this case, an xyz coordinate system is defined, as shown in FIGS. 1A and 1B. The surface shape measurement apparatus includes a base plate 101, a reference frame 102 supported by the base plate 101, a work holder 106 supported by the base plate 101, and a measurement head 110. The work holder 106 holds an object to be measured having a surface 10 to be measured. The surface shape measurement apparatus includes a reference plane mirror 103 required to measure an x position of the measurement head 110, a reference plane mirror 104 required to measure a y position of the measurement head 110, and a reference plane mirror 105 required to measure a z position of the measurement head 110. These mirrors are attached to the reference frame 102.

The surface shape measurement apparatus further includes, as a scanning mechanism for scanning the measurement head 110, an XYZ stage mechanism including an X-slide 107, Y-slide 108, and Z-slide 109. The measurement head 110 is mounted on the Z-slide 109, which is mounted on the X-slide 107 and is driven in a z-axis direction by a driving mechanism (not shown). The X-slide 107 is mounted on the Y-slide 108, and is driven in an x-axis direction by a driving mechanism (not shown). The Y-slide 108 is mounted on the base plate 101, and is driven in a y-axis direction by a driving mechanism (not shown). Hence, the surface shape measurement apparatus has an arrangement which can three-dimensionally change a relative positional relationship between the measurement head 110 and surface 10 to be measured.

A laser beam emitted from a 2-frequency oscillation laser 1 for heterodyne interferometric distance measurement is guided to a fiber input collimator 3 via a polarization maintaining fiber 2. The laser beam emerging from the collimator 3 is reflected by a mirror 111 attached to the Y-slide 108. After that, the laser beam is guided to laser interferometers 115, 116, and 117 by a non-polarizing beam splitter 112 and reflecting prism 113 attached on the X-slide 107 and a non-polarizing beam splitter 114 attached on the Z-slide 109. In this case, the laser interferometers 115, 116, and 117 are those for respectively measuring the x, y, and z positions. Interference signals obtained by the laser interferometers 115, 116, and 117 are provided to a signal processing unit 7 via an optical fiber (not shown). The X-, Y-, and Z-slides 107, 108, and 109 are controlled by an XYZ stage control unit 8.

A computer (processor) 9 includes a function of setting a scanning path of the measurement head 110, a function of acquiring a measurement data group, a function of calculating the surface shape of the surface 10 as a three-dimensional coordinate group, a function of calibrating the coordinates of the scanning path, and a function of correcting the measurement result of the surface shape of the surface 10. The computer 9 generates a coordinate group that expresses the scanning path, and the control unit 8 of the XYZ stage mechanism controls driving mechanisms (not shown) in the XYZ stage mechanism based on the coordinate group, thereby scanning the measurement head 110 along the scanning path. The computer 9 acquires, as a measurement data group, the distance information q from the measurement head 110 on the scanning path and the position information of the measurement head 110 from the laser interferometers 115, 116, and 117 via the signal processing unit 7. The computer 9 executes arithmetic processing of the acquired measurement data group to calculate the surface shape of the surface 10 as a three-dimensional coordinate group, to calibrate the coordinates of the scanning path, and to correct the measurement result of the surface shape of the surface 10.

The surface shape measurement apparatus includes an origin unit 121 which specifies an origin of the xyz coordinate system of the surface shape measurement apparatus. The origin unit 121 includes a concave spherical surface (not shown), and the center of curvature of that spherical surface is specified as the origin of the xyz coordinate system of the surface shape measurement apparatus.

A laser unit 4 is a light source which provides a light beam to the measurement head 110. The laser unit 4 provides, to the measurement head 110, two light beams for heterodyne interferometric distance measurement (the directions of polarization of these light beams are perpendicular to each other, and they have slightly different frequencies) by emitting the light beams onto a single optical path. The laser unit 4 generates a reference beat signal including beats based on a frequency difference of the two light beams to be provided to the measurement head 110, and provides the generated signal to the signal processing unit 7. The laser beams emitted by the laser unit 4 are guided to a beam expander 201 of the measurement head 110 shown in FIG. 2 via a polarization maintaining fiber 5, fiber input collimator 6, and mirrors 118, 119, and 120.

The measurement head 110 will be described below with reference to FIG. 2. The measurement head 110 configures a Twyman-Green interferometer. An illumination optical system is configured by the beam expander 201, a polarizing beam splitter 202, a λ/4 plate 209, and an objective lens 210. A light receiving optical system is configured by the objective lens 210, the λ/4 plate 209, the polarizing beam splitter 202, a condenser lens 205, and a shielding member 207. S-polarized light components of a light beam emerging from the beam expander 201 are transmitted through the polarizing beam splitter 202, and its P-polarized light components are reflected by the splitter 202, thus splitting the light beam into linearly polarized light components having orthogonal directions of polarization. The transmitted light beam travels toward a reference surface 204 side, and the reflected light beam travels toward the surface 10 side. The light beam which travels toward the reference surface 204 side is converted into circularly polarized light by a λ/4 plate 203, and is reflected in a normal direction by the reference surface 204. This light beam is transmitted through the λ/4 plate 203 again, is converted into linearly polarized light, and returns to the polarizing beam splitter 202. In this case, since this light beam is linearly polarized light of S-polarized light components with respect to the polarizing beam splitter 202, it is reflected by the splitter 202 and travels toward the condenser lens 205 side.

On the other hand, the light beam which travels toward the surface 10 side is converted into circularly polarized light by the λ/4 plate 209, and enters the objective lens 210. This light beam is converted into a spherical wave having a focal point 211 (point F) of the objective lens 210 as the center of curvature, and is then reflected by the surface 10. Of light beam components reflected by the surface 10, a light beam 212 reflected in a normal direction of the surface 10 goes back through the objective lens 210 as test light and returns to the λ/4 plate 209. In this case, since this light beam is linearly polarized light of P-polarized light components with respect to the polarizing beam splitter 202, it is transmitted through the splitter 202 and travels toward the condenser lens 205 side. Light (reference light) reflected by the reference surface 204 and light (test light) reflected by the surface 10 form an interference wave, which reaches an interference signal detecting unit 208 via the condenser lens 205, thus detecting a measurement beat signal. This measurement beat signal is provided to the signal processing unit 7 via a cable 213. The signal processing unit 7 integrates a frequency difference between the reference beat signal provided from the laser unit 4 and the measurement beat signal provided from the signal detecting unit 208, thereby detecting a change in optical path length between the reference surface 204 and surface 10.

Figure 2:
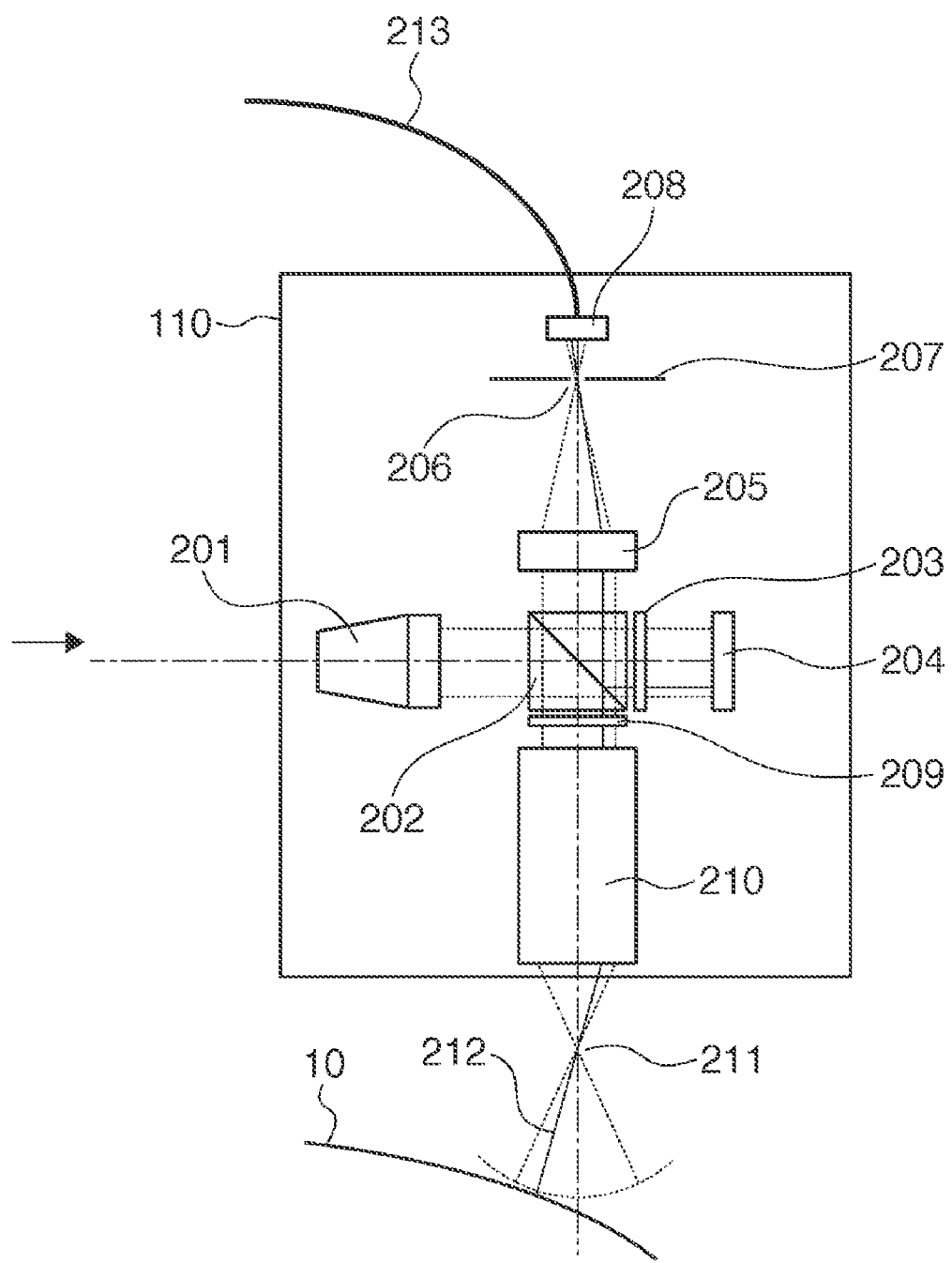
FIG. 2 is a schematic view showing the arrangement of a measurement head according to the embodiment of the present invention.

In FIG. 2, a focal point 206 of the condenser lens 205 has a conjugate relationship to the focal point 211 (point F) of the objective lens 210. The shielding member 207 passes only a light beam which is focused on the focal point 206 of the condenser lens 205 and near the focal point 206 through itself.

Then, only the light beam 212, which is reflected in the normal direction, of those reflected by the surface 10, enters the interference signal detecting unit 208. Therefore, a change in optical path length between the reference surface 204 and surface 10, which is detected by the signal processing unit 7, is equivalent to a change in optical path length between the focal point 211 and a portion that reflects the light beam in the normal direction on the surface 10. In this way, a distance between the focal point 211 and the portion that reflects the light beam in the normal direction on the surface 10 can be detected.

However, a change in optical path length cannot often be correctly obtained depending on the shape of the surface 10. For example, this is the case when the surface 10 has a common center of curvature over a broad region, and the position of the center of curvature of the surface 10 matches the reference point F on the scanning path. In this case, since reflected light from the broad region of the surface 10 returns to only the vicinity of the center of curvature, an interference signal cannot be obtained even by a slight scan. For example, such phenomenon may occur when the surface 10 is a spherical surface. In such case, by setting the scanning path to be sufficiently separated away from the center of curvature of the surface to be measured, a change in optical path length can be correctly obtained. Therefore, it becomes possible to measure the shape of the surface 10.

Also, a change in optical path length cannot be correctly obtained when the surface 10 has two or more intersecting normals, and an intersection of the two or more normals on the surface 10 matches the reference point F on the scanning path. This is because interferences caused by reflected light beams from a plurality of different regions take place. Even in such case, by setting the scanning path to be sufficiently separated away from the intersection of the two or more normals on the surface to be detected, a change in optical path length can be correctly obtained. Therefore, it becomes possible to measure the shape of the surface 10.

The surface shape measurement sequence and algorithm in the aforementioned arrangement will be described below. As described above, the point F(s, t, u) represents the coordinates of the center (reference point) of a spherical wave emitted from the measurement head 110. The point C(x, y, z) represents the coordinates of a point where the spherical wave having the point F(s, t, u) as the center is reflected by the surface 10 in the normal direction. Reference symbol q denotes the distance between the point C(x, y, z) and the point F(s, t, u). n=(α, β, γ) is a unit normal vector at the point C(x, y, z) on the surface 10.

The coordinates of the point F(s, t, u) are measured using the laser interferometers 115, 116, and 117, as will be described in detail later. The distance q between the point C(x, y, z) and point F(s, t, u) is measured using the measurement head 110, as will be described in detail later. As described above, the point C(x, y, z) on the surface 10 can be expressed by equations (3), (4), and (5). The laser interferometers 115, 116, and 117 measure the position of the point F while scanning the measurement head 110 along the scanning path, the measurement head 110 measures the distance q, and a coordinate group of the point C on the surface 10 can be calculated according to equations (3), (4), and (5). The calculated coordinate group of the point C on the surface 10 corresponds to a surface shape.

Figure 4:
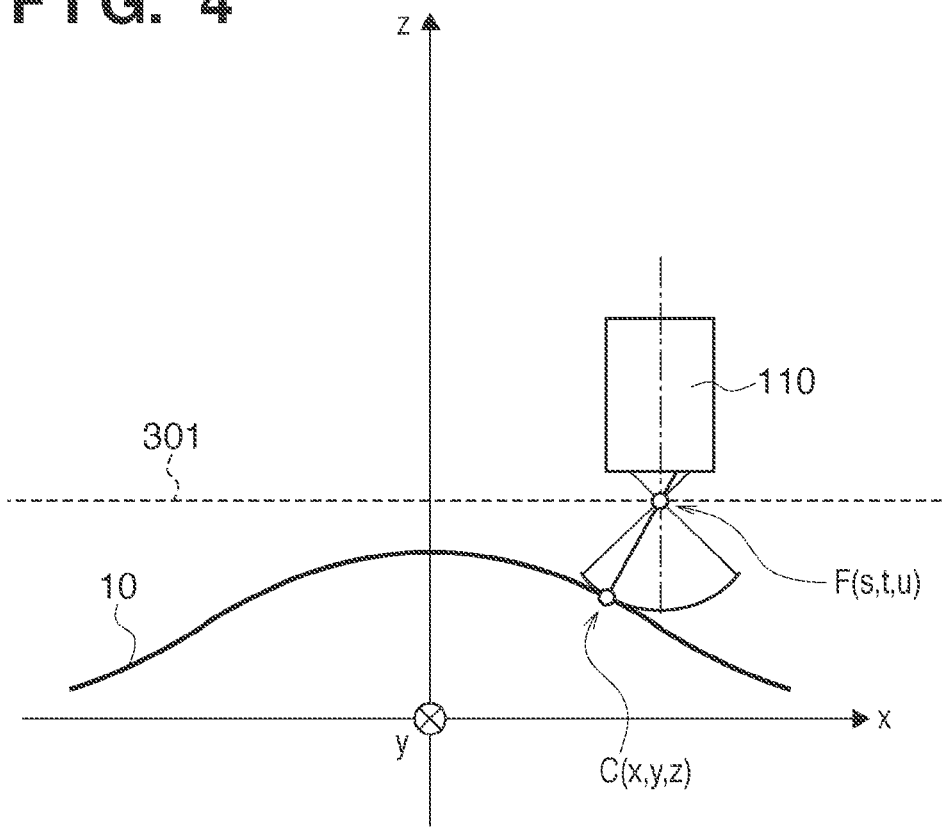
FIG. 4 is a view showing an example of a scanning path.
Figure 5:
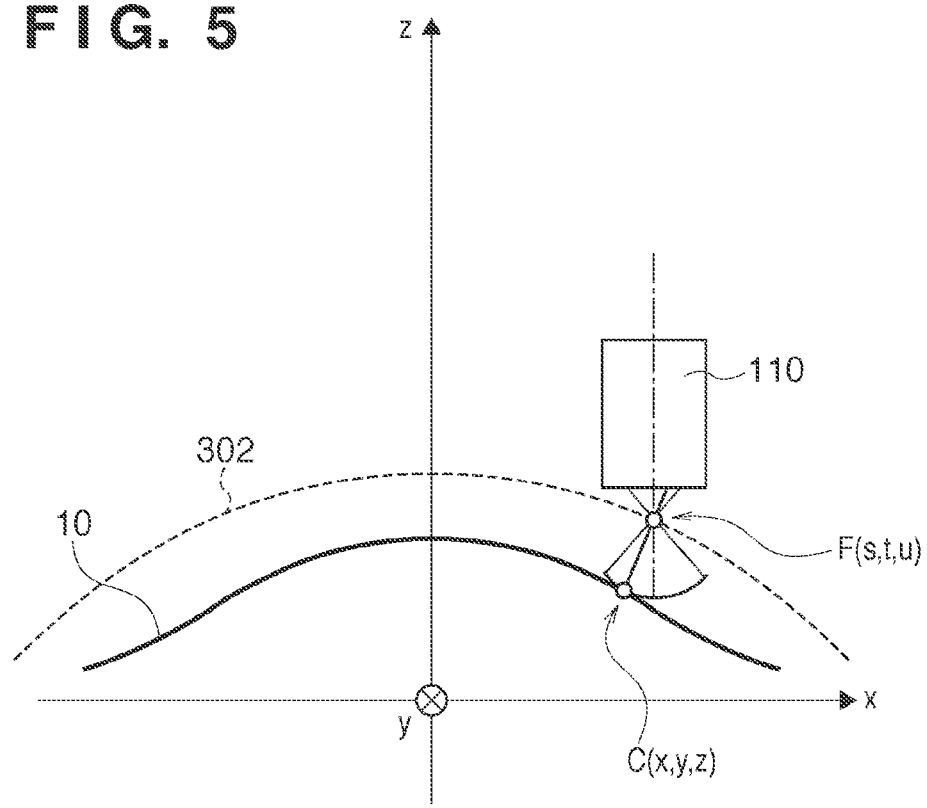
FIG. 5 is a view showing another example of a scanning path.

FIGS. 4 and 5 show examples of the scanning path. FIG. 4 shows an example in which the scanning path is located on a plane. In the example shown in FIG. 4, the measurement head 110 is scanned so that the reference point F(s, t, u) of the measurement head 110 moves along a plane 301 as the scanning path. FIG. 5 shows an example in which the scanning path is located on a spherical surface. In the example shown in FIG. 5, the measurement head 110 is scanned so that the reference point F of the measurement head 110 moves along a spherical surface 302 as the scanning path. In addition, the scanning path can be arbitrarily decided according to the shape of the surface 10.

When the laser interferometers 115, 116, and 117 measure the position of the point F(s, t, u) while scanning the measurement head 110 along the scanning path, and the measurement head 110 measures the distance q, the following measurement data group can be obtained. Note that suffixes 1, 2, . . . , j, . . . , N mean data numbers.

$$(s_1, t_1, u_1), q_1$$
$$(s_2, t_2, u_2), q_2$$
$$\vdots$$
$$(s_j, t_j, u_j), q_j$$
$$\vdots$$
$$(s_N, t_N, u_N), q_N$$

Of this data group, a unit normal vector $n_j=(\alpha_j, \beta_j, \gamma_j)$ at the j-th measurement point can be calculated as follows.

As measurement points located in the vicinity of the j-th point, (k+1) measurement points including the j-th measurement point are selected. In this case, at least three points of the (k+1) measurement points are selected not to be aligned on an identical line. By applying the relationship of equation (5) above, the following simultaneous equation is obtained.

$$\begin{pmatrix} \Delta s_{j1} & \Delta t_{j1} & \Delta u_{j1} \\ \Delta s_{j2} & \Delta t_{j2} & \Delta u_{j2} \\ \vdots & \vdots & \vdots \\ \Delta s_{jk} & \Delta t_{jk} & \Delta u_{jk} \end{pmatrix} \begin{pmatrix} \alpha_j \\ \beta_j \\ \gamma_j \end{pmatrix} = \begin{pmatrix} \Delta q_{j1} \\ \Delta q_{j2} \\ \vdots \\ \Delta q_{jk} \end{pmatrix} \quad (6)$$

where $$(\Delta s_{jm}, \Delta t_{jm}, \Delta u_{jm})=(s_{jm}, t_{jm}, u_{jm})-(s_j, t_j, u_j), \Delta q_{jm}=q_{jm}-q_j,$$

$(s_{jm}, t_{jm}, u_{jm})$: a measurement point located in the vicinity of the j-th measurement point, $q_{jm}$: a distance between the points C and F at a measurement point located in the vicinity of the j-th measurement point, and m=1, 2, . . . ,k.

From a property of the unit normal vector, we have:

$$\alpha_j^2+\beta_j^2+\gamma_j^2=1 \quad (7)$$

Equation (6) includes two or more independent rows depending on the method of selecting the measurement points. Therefore, by applying a least square method to equation (6) under the condition of equation (7), the unit normal vector $n_j=(\alpha_j, \beta_j, \gamma_j)$ at the j-th measurement point can be decided. By applying this result to equation (3), coordinates $C_j(x_j, y_j, z_j)$ of the surface 10 at the j-th measurement point are specified by:

$$(x_j,y_j,z_j)=(s_j,t_j,u_j)-q_j(\alpha_j,\beta_j,\gamma_j) \quad (8)$$

By making these calculations for the respective measurement points, a set of coordinate points which express the surface shape of the surface 10 can be decided like:

$$(x_1, y_1, z_1) \quad (9)$$
$$(x_2, y_2, z_2)$$
$$\vdots$$
$$(x_j, y_j, z_j)$$
$$\vdots$$
$$(x_N, y_N, z_N)$$

A method of measuring the reference point F(s, t, u) of the measurement head 110 by the laser interferometers 115, 116, and 117 will be described below. Normally, a laser interferometer measures a position by detecting a displacement amount from an origin since it is an incremental distance measuring device. In this embodiment, the origin unit 121 is used as an arrangement for providing an origin. Assume that the center (reference point) F of a spherical wave emitted by the measurement head 110 is matched with the origin of the surface shape measurement apparatus provided by the origin unit 121, and values provided by the laser interferometers 115, 116, and 117 at that time are those corresponding to the origin.

Figure 6:
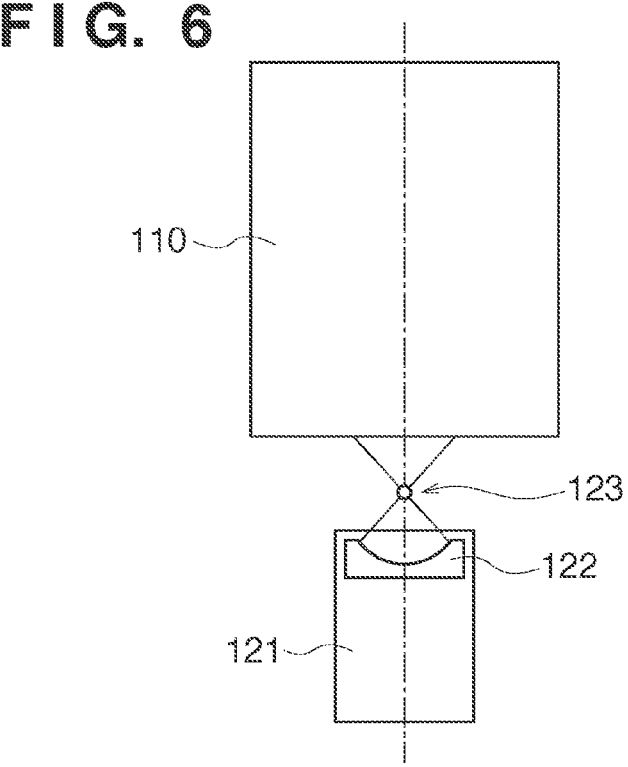
FIG. 6 is a view for explaining a method of deciding an origin of the measurement head.

The method will be described in detail below with reference to FIG. 6. The center of curvature of a concave spherical surface 122 included in the origin unit 121 is an origin 123 of the surface shape measurement apparatus. When this origin 123 matches the center F of a spherical wave emitted from the measurement head 110, since all light beams reflected by the concave spherical surface 122 return to the measurement head 110, the amplitude of a measurement beat signal provided to the signal processing unit 7 is maximized. Based on a position of the maximum amplitude of the measurement beat signal, it is determined that the origin of the surface shape measurement apparatus provided by the origin unit 121 matches the center F of a spherical wave emitted from the measurement head 110. Assume that values provided from the laser interferometers 115, 116, and 117 at that time are those corresponding to the origin.

A method of measuring the distance q between the central point F of a spherical wave emitted from the measurement head 110 and the point C where the spherical wave is reflected by the surface 10 in the normal direction by the measurement head 110 will be described below. The measurement head 110 also configures an incremental distance measuring device. Hence, a value provided from the measurement head 110 in a state in which a distance between the central point F of a spherical wave emitted from the measurement head 110 and the point C where the spherical wave is reflected by the surface 10 in the normal direction is known is used as a reference value. Then, a change amount from that value is converted into a displacement amount, thereby measuring the distance q. This method will be described in more detail below with reference to FIGS. 7A and 7B. FIG. 7A shows a state in which the measurement head 110 is aligned so that the central point F of a spherical wave emitted from the measurement head 110 matches a point on the surface 10. At this time, the distance q is zero. Also, since a spherical wave emitted from the measurement head 110 in this case is reflected by the surface 10 in an apex reflection state (so-called cat's eye state), a light beam of the largest amount returns to the measurement head 110. Therefore, the amplitude of a measurement beat signal provided to the signal processing unit 7 is maximized. A measurement value corresponding to the maximum amplitude of the measurement beat signal can be decided as a reference value $Q_0$ of the distance q between the central point F of a spherical wave emitted from the measurement head 110 and the point C where the spherical wave is reflected by the surface 10 in the normal direction. FIG. 7B shows a state in which the measurement head 110 is scanned to be moved from the state shown in FIG. 7A to another position. As described above, the measurement head 110 has the arrangement for measuring a change in optical path length between the focal point 211, that is, the point F, and the portion C where a spherical wave is reflected by the surface 10 in the normal direction. Therefore, letting Q be a read value at that time, the distance q to be calculated is expressed by:

$$q = Q - Q_0 \quad (10)$$

As described above, the surface shape of the surface 10 can be measured by measuring the position of the reference point F of the measurement head 110 and the perpendicular distance q from the reference point F to the surface 10 while scanning the measurement head 110.

Figure 9:
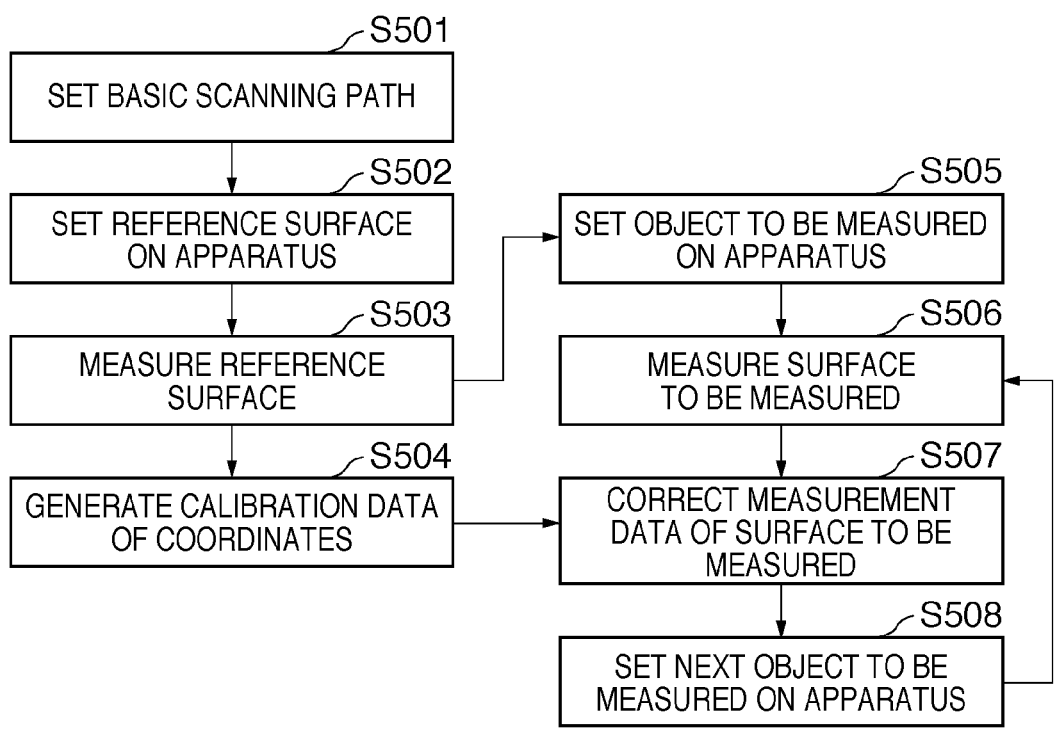
FIG. 9 is a flowchart showing calibration and correction sequences.

Calibration of coordinates by measuring the shape of a reference surface, and correction of measured data of the surface to be measured based on the calibrated coordinates will be explained below using examples. FIG. 9 is a flowchart showing the calibration and correction sequences. In step 501, the computer (processor) 9 sets a scanning path. The scanning path is a locus of the reference point F of the measurement head 110, and is expressed as a three-dimensional coordinate sequence on the scanning path by:

$$(s_j, t_j, u_j), j = 1, 2, \ldots, N \quad (11)$$

In steps 503 and 506 to be described later, the XYZ stage control unit 8 sets the coordinate sequence $(s_j, t_j, u_j)$ given by expression (11) as a target coordinate sequence (command values). Then, the XYZ stage control unit 8 controls the XYZ stage mechanism so that the reference point F(s, t, u) of the measurement head 110 scans the scanning path given by the coordinate sequence $(s_j, t_j, u_j)$. In this case, the scanning path given by expression (11) is commonly used in measurement of a reference surface and that of the surface 10. Also, measurement points on the scanning path are commonly used in measurement of the reference surface and that of the surface 10. As for measurement points for which those to be commonly used are not available, measurement points are generated by interpolation using surrounding measurement points, and can be set as those to be commonly used.

In step 502, a reference surface having a reference surface is set on the work holder 106 of the surface shape measurement apparatus. In step 503, the signal processing unit 7 sequentially generates shape measurement data which represent the coordinates of the reference surface of the reference surface while scanning the measurement head 110 according to the scanning path given by expression (11), and these shape measurement data are accumulated in the computer 9 as a shape measurement data group. In step 504, the computer 9 generates coordinate calibration data of the scanning path based on the shape measurement data group of the reference surface of the reference surface and given reference shape values of the reference surface. An example of generation of the calibration data will be described later.

In step 505, the reference surface is detached from the work holder 106, and an object to be measured having a surface 10 to be measured is set on the work holder 106 instead. In step 506, the signal processing unit 7 sequentially generates shape measurement data which represent the coordinates of the surface 10 while scanning the measurement head 110 along the scanning path (that is, the same path as that at the time of calibration) given by expression (11). The sequentially generated shape measurement data are accumulated in the computer 9 as a shape measurement data group. In step 507, the computer 9 corrects the shape measurement data group of the surface 10 using the coordinate calibration data calculated in step 504. An example of correction will be described later. In step 508, the object having the surface 10 is detached from the work holder 106, and a next object is set on the work holder 106 as needed. The process then returns to step 506 to measure the next object.

As described above, according to this embodiment, since the measurement head 110 is scanned according to the scanning path common to measurement of the reference surface and that of the surface 10, no measurement errors due to a scanning path difference are generated, and the surface shape of the surface 10 can be measured with high precision.

An example of generation of the coordinate calibration data in step 504 will be described below. In this example, the coordinates of centers $F(s_j, t_j, u_j)$ are calibrated under the assumption that the measurement precision of distances q from the reference points $F(s_j, t_j, u_j)$ of the measurement head 110 to the reference surface is sufficiently high. The measurement precision of $q_j$ mainly depends on a wavefront aberration of the measurement head 110, and a precision from submicron to sub-nanometer levels can be generally achieved.

In step 504, the shape measurement data group of the reference surface is obtained according to equation (8). The shape measurement data group is expressed by:

$$(x_j', y_j', z_j') = (s_j, t_j, u_j) - q_j'(\alpha_j', \beta_j', \gamma_j') \; j = 1, 2, \ldots, N \quad (12)$$

where $(s_j, t_j, u_j)$ is a vector indicating the reference point coordinates of the measurement head 110, that is, the target coordinate sequence (command values) indicating the scanning path. $q_j'$ is a measurement value of the distance $q_j$. $(\alpha_j', \beta_j', \gamma_j')$ is a unit normal vector calculated based on the target coordinate sequence (command values) $(s_j, t_j, u_j)$ indicating the scanning path and the measurement value $q_j'$ of the perpendicular distance $q_j$.

On the other hand, a shape $(x_j, y_j, z_j)$ of the reference surface is given, and according to equation (8), it has, with the target coordinate sequence (command values) $(s_j, t_j, u_j)$ indicating the scanning path, a relationship given by:

$$(x_j, y_j, z_j) = (s_j, t_j, u_j) - q_j(\alpha_j, \beta_j, \gamma_j) \; j = 1, 2, \ldots, N \quad (13)$$

where $q_j$ is a perpendicular distance calculated from the scanning path and the given shape of the reference surface. $(\alpha_j, \beta_j, \gamma_j)$ is a unit normal vector calculated based on the target coordinate sequence (command values) $(s_j, t_j, u_j)$ indicating the scanning path and the calculated value $q_j$ of the perpendicular distance.

In this case, since the above example has been explained under the assumption that the measurement precision of the perpendicular distances $q_j'$ is sufficiently high, differences between $(x_j', y_j', z_j')$ and $(x_j, y_j, z_j)$ are caused by those between the target coordinate sequence (command values) $(s_j, t_j, u_j)$ indicating the scanning path and an actual scanning path. Therefore, using, as $(s_j, t_j, u_j)$, actual positions in place of the command values, the surface shape can be correctly calculated. The actual positions are calibration values of the reference point coordinates of the measurement head 110.

The actual positions with respect to the target coordinate sequence (command values) $(s_j, t_j, u_j)$ can be decided as follows. In this case, an x-component will be described below for the sake of simplicity. From equation (13), the x-component in the coordinates of the surface of the reference surface is expressed by:

$$x_j = s_j - q_j \cdot \alpha_j \quad (14)$$

In this case, when an actual central coordinate of a spherical wave is that obtained by adding an offset value $\delta s_j$ to a command value $s_j$, it can be considered that $x_j$ is measured as $x_j'$. A change amount of $x_j$ by the offset value $\delta s_j$ can be expressed by:

$$\delta x_j = \delta s_j - q_j \delta \alpha_j - \alpha_j \delta q_j \qquad (15)$$

$$= \delta s_j - q_j \frac{\partial \alpha_j}{\partial s_j} \delta s_j - \alpha_j \frac{\partial q_j}{\partial s_j} \delta s_j$$

$$= \left(1 - q_j \frac{\partial \alpha_j}{\partial s_j} - \alpha_j \frac{\partial q_j}{\partial s_j}\right) \delta s_j$$

Hence, by modifying equation (15), the offset value $\delta s_j$ can be expressed by:

$$\delta s_j = \frac{x_j' - x_j}{1 - q_j \frac{\partial \alpha_j}{\partial s_j} - \alpha_j \frac{\partial q_j}{\partial s_j}} \qquad (16)$$

The same applies to the remaining components. Offsets ($\delta s_j, \delta t_j, \delta u_j$) with respect to command values ($s_j, t_j, u_j$) of the reference point coordinates of the measurement head 110 are given by:

$$\begin{cases} \delta s_j = \dfrac{x_j' - x_j}{1 - q_j \frac{\partial \alpha_j}{\partial s_j} - \alpha_j \frac{\partial q_j}{\partial s_j}} \\ \delta t_j = \dfrac{y_j' - y_j}{1 - q_j \frac{\partial \alpha_j}{\partial t_j} - \alpha_j \frac{\partial q_j}{\partial t_j}} \\ \delta u_j = \dfrac{z_j' - z_j}{1 - q_j \frac{\partial \alpha_j}{\partial u_j} - \alpha_j \frac{\partial q_j}{\partial u_j}} \end{cases} \qquad (17)$$

$$j = 1, 2, \ldots, N$$

Hence, in step 504, the calibrated coordinates of the reference point coordinates of the measurement head 110 are given as coordinates obtained by correcting the command values ($s_j, t_j, u_j$) of the reference point coordinates by the offsets ($\delta s_j, \delta t_j, \delta u_j$), as described by:

$$(s_j + \delta s_j, t_j + \delta t_j, u_j + \delta u_j) \, j=1,2,\ldots,N \qquad (18)$$

In step 507, the aforementioned algorithm for calculating the shape is executed using the calibrated reference point coordinates given by expression (18), thus obtaining the corrected shape of the surface to be measured.

According to this embodiment, since the measurement head is scanned along the same scanning path at the times of calibration and measurement, the surface shape can be measured at higher precision than an arrangement which scans the measurement head along independent scanning paths at the times of calibration and measurement.

(Second Embodiment)

This embodiment will explain a case in which a measurement head 110 measures a reference point position F(s, t, u) of the measurement head 110 and a unit normal vector ($\alpha, \beta, \gamma$) from a surface to be measured to the reference point F. Items which are not mentioned in this embodiment can follow the first embodiment. Equation (4) above can be expressed in an integral format as:

$$q = q_0 + \int (\alpha ds + \beta dt + \gamma du) \qquad (20)$$

where $q_0$ is an integral constant.

Therefore, from the reference point position F(s, t, u) of the measurement head 110 and the unit normal vector ($\alpha, \beta, \gamma$) from the surface to be measured to the reference point F, a perpendicular distance q is obtained by equation (20), and is substituted in equation (3) to obtain a shape.

The measurement head 110 will be described below with reference to FIG. 10. The measurement head 110 includes an illumination optical system and light receiving optical system. The illumination optical system is configured by a beam expander 1201, polarizing beam splitter 1202, $\lambda/4$ plate 1209, and objective lens 1210. The light receiving optical system is configured by the objective lens 1210, the $\lambda/4$ plate 1209, the polarizing beam splitter 1202, a condenser lens 1205, and a shielding member 1207. A light beam emerging from the beam expander 1201 is S-polarized light, is reflected by the polarizing beam splitter 1202, and travels toward a surface 10 to be measured side.

The light beam which travels toward the surface 10 side is converted into circularly polarized light by the $\lambda/4$ plate 1209, and enters the objective lens 1210. This light beam is converted into a spherical wave having a focal point 1211 (point F) of the objective lens 1210 as a center of curvature. The spherical wave becomes incident on the surface 10, and is reflected by the surface 10. Of light beam components reflected by the surface 10, a light beam 1212 which is reflected in a normal direction goes back through the objective lens 1210 as test light, is transmitted through the $\lambda/4$ plate 1209 again, and is linearly converted by the $\lambda/4$ plate 1209. The light beam transmitted through the $\lambda/4$ plate 1209 is linearly polarized light of P-polarized light components with respect to the polarizing beam splitter 1202. Hence, this light beam is transmitted through the polarizing beam splitter 1202, travels toward the condenser lens 1205 side, and reaches a position detecting unit 1208. The position detecting unit 1208 includes a light spot position sensor, and detects a light beam position signal indicating the position of the light beam which enters the light spot position sensor as information of a direction of the light beam 1212 which is reflected by the surface 10 in the normal direction and returns to the measurement head 110. This light beam position signal includes information indicating a light amount. The detected light beam position signal is provided to a signal processing unit 7 via a cable 1213. The signal processing unit 7 detects, based on the light beam position signal provided from the measurement head 110, a unit normal vector indicating a direction of the light beam 1212 which is reflected by the surface 10 in the normal direction and returns to the measurement head 110, that is, a normal vector to the surface 10. As the light spot position sensor, a two-dimensional photosensitive detector (PSD), two-dimensional image sensor (CCD), and the like may be used.

Figure 10:
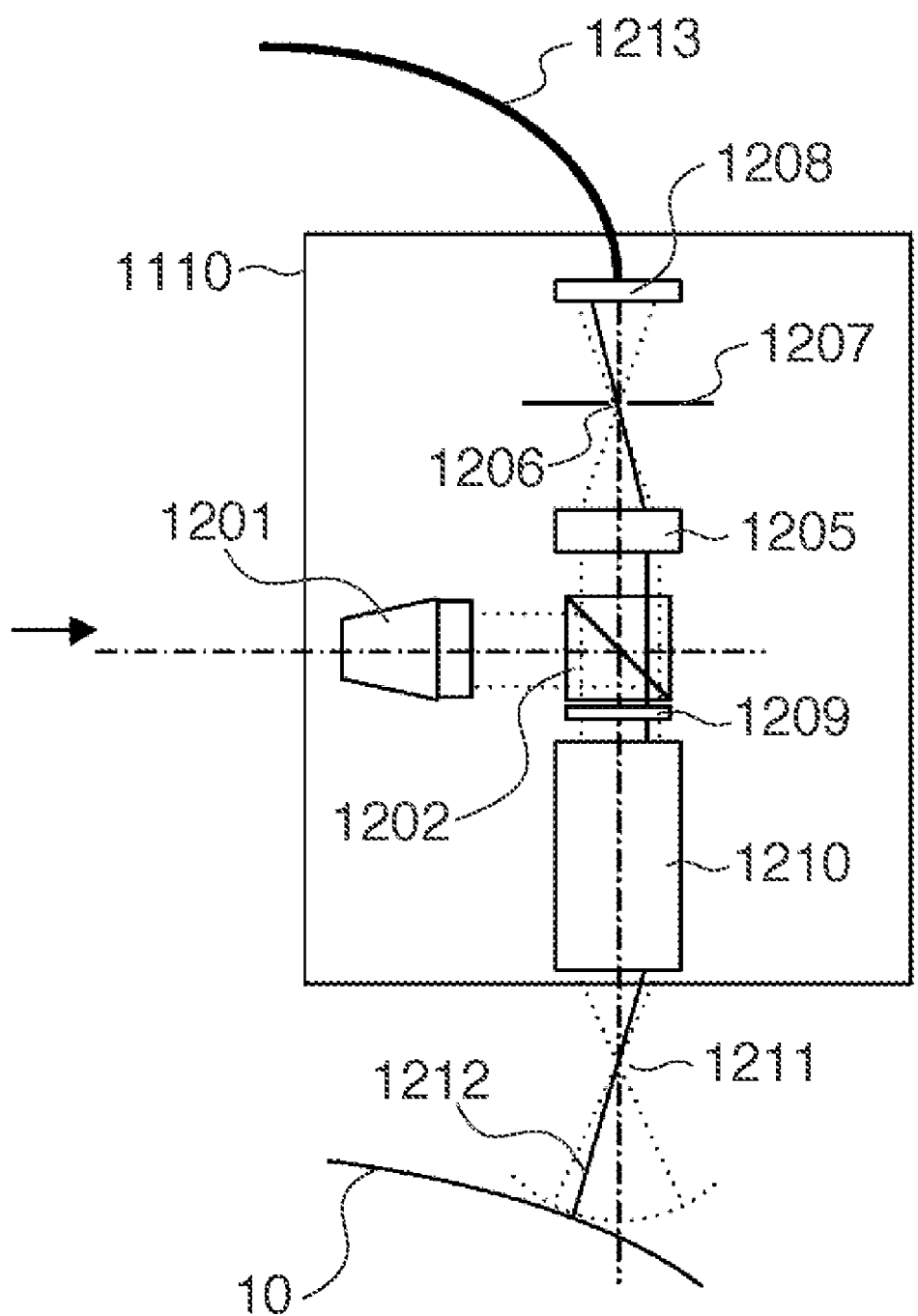
FIG. 10 is a schematic view showing the arrangement of a measurement head according to an embodiment of the present invention.

In FIG. 10, a focal point 1206 of the condenser lens 1205 has a conjugate relationship to the focal point 1211 (point F) of the objective lens 1210. The shielding member 1207 passes only a light beam which is focused on the focal point 1206 of the condenser lens 1205 and near the focal point 1206 through itself. Then, only the light beam 1212, which is reflected in the normal direction of the surface 10, of those reflected by the surface 10, enters the position detecting unit 1208. Therefore, this light beam position signal includes information indicating a normal vector to the surface 10.

However, the light beam position signal often does not indicate a normal vector to the surface 10 depending on the shape of the surface 10. For example, this is the case when the surface 10 has a common center of curvature over a broad region, and the position of the center of curvature of the surface 10 matches the reference point F on the scanning path.

In this case, such phenomenon is caused since reflected light from the broad region enters the position detecting unit 1208. For example, this phenomenon may occur when the surface 10 is a spherical surface. In such case, by setting the scanning path to be sufficiently separated away from the center of curvature of the surface 10, the light beam position signal can indicate a normal vector to the surface 10. Therefore, it becomes possible to measure the shape of the surface 10.

Also, the light beam position signal does not indicate a normal vector to the surface 10 when the surface 10 has two or more intersecting normals, and an intersection of the two or more normals on the surface 10 matches the reference point F on the scanning path. This is because reflected light beams from a plurality of different regions enter the position detecting unit 1208. Even in such case, by setting the scanning path to be sufficiently separated away from the intersection of the two or more normals on the surface 10, a change in optical path length can be correctly obtained. Therefore, it becomes possible to measure the shape of the surface 10.

A calculation method of a unit normal vector in this embodiment will be described below more practically. The position detecting unit 1208 detects x and y positions of the test light beam 1212. More specifically, the position detecting unit 1208 generates light beam position detection signals indicating the x and y positions of the test light beam 1212. Let Dx and Dy be the x and y positions of the test light beam 1212, respectively. This x position is proportional to a direction cosine $\alpha$ with respect to an x axis, and the y position is proportional to a direction cosine $\beta$ with respect to a y axis. Letting K be this proportional coefficient, the positions Dx and Dy of the test light beam detected by the position detecting unit 1208 are respectively given by:

$$Dx = K\alpha$$

$$Dy = K\beta$$

where K is a constant specified based on the arrangement of the light receiving optical system of the measurement head 110. From this relationship and a property of a unit normal vector, which is given by:

$$\alpha^2 + \beta^2 + \gamma^2 = 1$$

the unit normal vector can be calculated as:

$$\alpha = Dx/K$$

$$\beta = Dy/K$$

$$\gamma = (1 - \alpha^2 - \beta^2)^{1/2}$$

As described above, the point F(s, t, u) represents coordinates of a center of a spherical wave emitted from the measurement head 110, that is, a reference point. A point C(x, y, z) represents coordinates of a point where a spherical wave having the point F(s, t, u) as the center is reflected in the normal direction by the surface 10. Reference symbol q denotes a distance between the point C(x, y, z) and point F(s, t, u). $n = (\alpha, \beta, \gamma)$ is a unit normal vector at the point C(x, y, z) of the surface 10.

The coordinates of the point F(s, t, u) are measured using laser interferometers 115, 116, and 117, as will be described in detail later. The unit normal vector $n = (\alpha, \beta, \gamma)$ is measured using the measurement head 110. As described above, the point C(x, y, z) on the surface 10 can be expressed by equations (3), (4), and (20). The laser interferometers 115, 116, and 117 measure the position of the point F while scanning the measurement head 110 along the scanning path, and the measurement head 110 measures the unit normal vector $n = (\alpha, \beta, \gamma)$. Then, according to equations (3), (4), and (20), a coordinate group of the point C on the surface 10, that is, a surface shape can be calculated.

When the laser interferometers 115, 116, and 117 measure the position of the point F(s, t, u) while scanning the measurement head 110 along the scanning path, and the measurement head 110 measures the unit normal vector $n = (\alpha, \beta, \gamma)$, the following measurement data group can be obtained. Note that suffices 1, 2, ..., j, ..., N mean data numbers.

$$(s_1, t_1, u_1), (\alpha_1, \beta_1, \gamma_1)$$
$$(s_2, t_2, u_2), (\alpha_2, \beta_2, \gamma_2)$$
$$\vdots$$
$$(s_j, t_j, u_j), (\alpha_i, \beta_i, \gamma_i)$$
$$\vdots$$
$$(s_N, t_N, u_N), (\alpha_N, \beta_N, \gamma_N)$$

Of this data group, a distance $q_j$ at the i-th measurement point can be calculated as follows.

From equation (20), the distance $q_j$ at a point i=j is given by:

$$q_j = q_0 + \sum_{k=2}^{i} (\alpha_k \Delta s_k + \beta_k \Delta t_k + \gamma_k \Delta u_k) \qquad (21)$$

for $(\Delta s_k, \Delta t_k, \Delta u_k) = (S_k, t_k, u_k) - (s_{k-1}, t_{k-1}, u_{k-1})$ A method of specifying an integral constant $q_0$ will be described later.

In this case, the position $(s_j, t_j, u_j)$ of the point F and the unit normal vector $(\alpha_j, \beta_j, \gamma_j)$ at the measurement point j, and the distance $q_j$ calculated by equation (21) are substituted in equation (3). Then, coordinates $C_j(x_j, y_j, z_j)$ of the surface 10 at the j-th measurement point are given by:

$$(x_j, y_j, z_j) = (s_j, t_j, u_j) - q_j(\alpha_j, \beta_j, \gamma_j) \qquad (22)$$

By making these calculations for the respective measurement points, a set of coordinate points which express the surface shape of the surface 10 can be decided like:

$$(x_1, y_1, z_1) \qquad (23)$$
$$(x_2, y_2, z_2)$$
$$\vdots$$
$$(x_j, y_j, z_j)$$
$$\vdots$$
$$(x_N, y_N, z_N)$$

A method of measuring the reference point F(s, t, u) of the measurement head 110 by the laser interferometers 115, 116, and 117 will be described below. Normally, a laser interferometer measures a position by detecting a displacement amount from an origin since it is an incremental distance measuring device. In this embodiment, an origin unit 121 is used as an arrangement for providing an origin. Assume that the center of a spherical wave emitted by the measurement head 110, that is, the reference point F is matched with the origin of the surface shape measurement apparatus provided by the origin unit 121, and values provided by the laser interferometers 115, 116, and 117 at that time are those corresponding to the origin.

The method will be described in detail below with reference to FIG. 6. The center of curvature of a concave spherical surface 122 included in the origin unit 121 is an origin 123 of the surface shape measurement apparatus. When this origin 123 matches the center of a spherical wave emitted from the measurement head 110, that is, the reference point F, since all light beams reflected by the concave spherical surface 122 return to the measurement head 110, the light beam position signal provided to the signal processing unit 7 is maximized. Based on a position of the maximum light amount, it is determined that the origin of the surface shape measurement apparatus provided by the origin unit 121 matches the reference point F of the measurement head 110. Assume that values provided from the laser interferometers 115, 116, and 117 at that time are those corresponding to the origin.

A method of specifying the integral constant $q_0$ will be described below. In a first example, the integral constant $q_0$ can be specified as a perpendicular distance between the reference point F at a starting point of an integral path given by equation (20), that is, that of the scanning path, and the surface 10. Therefore, by calculating the perpendicular distance between the reference point F at the starting point of the scanning path and the surface 10, the integral constant $q_0$ can be specified.

A more practical example will be explained below with reference to FIGS. 11A and 11B. FIG. 11A shows a layout at the starting point of the scanning path. Reference symbol F denotes a reference point; and C, a point on the surface 10 where a spherical wave emitted from the reference point F is reflected in the normal direction of the surface to be measured. FIG. 11B illustrates that the measurement head 110 is laid out so that the reference point F matches the point C on the surface 10. In this case, the point C in FIG. 11B is the same point as the point C in FIG. 11A, that is, the point on the surface to be measured where a spherical wave emitted from the reference point F is reflected in the normal direction of the surface 10 at the starting point of the scanning path. A moving distance when the measurement head 110 is moved along the direction of the unit normal vector n in FIG. 11A from the state shown in FIG. 11A to that shown in FIG. 11B is the integral constant $q_0$.

At the position in FIG. 11B, since a spherical wave emitted from the measurement head 110 is reflected by the surface 10 in an apex reflection state (so-called cat's eye state), a light beam of the largest amount returns to the measurement head 110. Therefore, based on a position where a value of the light beam position signal is maximized while moving the measurement head 110 along the direction of measured values of the unit normal vector n in FIG. 11A, it can be decided that the position of FIG. 11B is reached. Based on the positions of the measurement head 110 in FIGS. 11A and 11B, a moving distance, that is, the integral constant $q_0$ can be calculated. The position of the measurement head 110 is measured by the laser interferometers 115, 116, and 117, as described above.

In a second example, the integral constant $q_0$ can be specified as follows. That is, there is available a method of expressing the surface shape of the surface to be measured based on (a) the integral constant $q_0$ which is specified to minimize shape errors from a designed shape and (b) errors of the surface to be measured from a shape defined by this integral constant $q_0$ and the designed shape. For example, this is the case when a spherical surface shape is expressed by (a) a radius which is specified to minimize shape errors and (b) errors of the surface to be measured (surface precision) from a spherical surface having that radius.

In the second example, the integral constant $q_0$ can be calculated as follows. When an arbitrary value $q_0$ is set as the integral constant $q_0$, a shape can be expressed from equation (22) by:

$$(x_{0j}, y_{0j}, z_{0j}) = (s_j, t_j, u_j) - (q_0 + q_{0j})(\alpha_{0j}, \beta_{0j}, \gamma_{0j}) \tag{24}$$

where $(x_{0j}, y_{0j}, z_{0j})$ is a point on the surface t be measured, $(s_j, t_j, u_j)$ represents position coordinates of the reference point F, and $q_0 + q_{0j}$ is a distance from the reference point F to the surface to be measured, which distance is calculated from equation (21) to have the integral constant $q_0$ as an arbitrary value $q_0$.

Also, a designed shape $(x_j, y_j, z_j)$ is given by:

$$(x_j, y_j, z_j) = (s_j, t_j, u_j) - q_j(\alpha_j, \beta_j, \gamma_j) \tag{25}$$

where $(s_j, t_j, u_j)$ represents position coordinates of the reference point F and assumes the same value as in equation (24), and $q_j$ is a distance from the reference point F to the surface to be measured, which distance is calculated from the designed shape.

A closest condition of the shape of the surface to be measured and the designed shape is described by:

$$\text{Minimum} \left\{ \sum_{j=1}^{N} \{(x_{0j} - x_j)^2 + (y_{0j} - y_j)^2 + (z_{0j} - z_j)^2\} \right\} \tag{26}$$

Therefore, equations (24) and (25) are substituted into expression (26), and a least square method is applied for $q_0$, thus calculating the integral constant $q_0$.

As described above, by measuring the position of the reference point F of the measurement head 110 and the unit normal vector $(\alpha\ \beta\ \gamma)$ while scanning the measurement head 110, the surface shape of the surface 10 can be measured.

(Third Embodiment)

A perpendicular distance q can be measured by, for example, an absolute distance measuring device. This embodiment will explain a case in which a measurement head 110 is configured as an absolute distance measuring device. Note that items which are not mentioned in this embodiment can follow the first embodiment.

Japanese Patent No. 2764630 discloses an absolute distance measuring device. The absolute distance measuring device disclosed in Japanese Patent No. 2764630 has a function of specifying orders of interference of interference fringes of light, and measures an absolute distance to an object using this function. The absolute distance measuring device includes (a) a light source which can continuously change a frequency of output light within a predetermined range, and (b) a frequency stabilizing unit of the light source. The absolute distance measuring device also includes (c) an interference phase measuring unit which measures an interference phase between reflected light from the object and reference light, and (d) a unit which has at least one length reference, and measures an interference phase obtained to have the length reference as an optical path difference. The frequency stabilizing unit includes a light absorbing cell, light sensor, and feedback unit. The light absorbing cell has a light absorbing peak in a specific frequency range, and receives the output light of the light source. The light sensor measures the intensity of light which has passed through the light absorbing cell. The feedback unit detects based on a decrease in output from the light sensor that the frequency of the output light of the light source reaches the frequency of the absorbing peak of the light absorbing cell, and feeds back a control signal to the light source. The frequency stabilizing unit fixes the frequency of the light source at the frequency of the absorbing peak when the frequency of the light source matches that of the absorbing peak.

In one embodiment of the present invention, the absolute distance measuring device is configured to include a light source unit 522, interference phase measuring unit, and arithmetic unit, which are exemplified in FIG. 12. The light source unit 522 can be used as a laser unit 4 shown in FIGS. 1A and 1B. The light source unit 522 can include a light source 520 and correction unit 521. The interference phase measuring unit is configured by the measurement head 110. The arithmetic unit can be incorporated in a signal processing unit 7.

The light source 520 includes a DBR laser 501, collimator lens 502, half mirrors 508 and 509, Rb gas cell 503, light sensor (photodiode) 505, light sensor 506, and comparator 507. The DBR laser 501 can change an oscillation frequency by a driving current. The light sensor 505 directly measures the intensity of output light of the DBR laser 501. The light sensor 506 measures the intensity of a laser beam which has passed through the Rb cell 503.

The correction unit 521 includes half mirrors 510 and 511, reflecting mirror 512, reference gap (made up of a material having a small coefficient of thermal expansion such as ZERODUR or Superinvar) 513 having a reference length Lr, and light sensor 514. A light beam generated by the light source 520 emerges from the light source 522 via the half mirror 510. This light beam is guided to a beam expander 201 of the measurement head 110 exemplified in FIG. 2 via a polarization maintaining fiber 5, fiber input collimator 6, and mirrors 118, 119, and 120. The measurement head 110 serves as the interference phase measuring unit, and provides its detection signal to the signal processing unit 7. A detection signal of the light sensor 514 of the correction unit 521 is also provided to the signal processing unit 7. The arithmetic unit incorporated in the signal processing unit 7 receives the detection signal from the measurement head 110 and that from the light sensor 514 of the correction unit 521, and absolutely calculates the distance q based on these detection signals.

Using the absolute distance measuring device, even when a light beam from a surface to be measured is interrupted (for example, when a surface to be detected is a discontinuous surface including steps and holes, or when foreign matters or scratches are present on the surface to be measured), the distance q can be measured. Therefore, using the absolute distance measuring device, even when a light beam from the surface to be measured is interrupted, the shape of the surface to be measured can be measured.

(Fourth Embodiment)

The fourth embodiment of the present invention will be described below with reference to FIG. 8. Items which are not mentioned in this embodiment can follow the first, second, or third embodiment. The fourth embodiment is suited to shape measurement of a concave aspherical mirror having a large diameter, which can be used in an astrometric telescope. Referring to FIG. 8, reference numeral 401 denotes an example of an approximate spherical surface of a surface 10 to be measured. In this example, the approximate spherical surface is a circumscribing circle of the surface 10. The approximate spherical surface may also be an inscribed spherical surface or approximate inscribed spherical surface. A point O is a center of the approximate spherical surface 401, a point F is a center, that is, a reference point of a spherical wave emitted from a measurement head 110, and a point C is a point where the spherical wave emitted from the measurement head 110 is reflected by the surface 10 in a normal direction. Reference numeral 402 denotes a scanning path.

The reference point of the measurement head 110 is scanned along this scanning path. FIG. 8 shows an example in which the scanning path is a plane parallel to an xy plane, but the scanning path need not be a plane.

As shown in FIG. 8, by allocating the scanning path 402 between the surface 10 and the center O of the approximate spherical surface 401, a region for scanning the measurement head 110 can be narrower than the surface 10. As a result, a size reduction of a surface shape measurement apparatus can be attained. Especially, this embodiment can provide an arrangement effective for shape measurement of a large-diameter aspherical surface of, for example, an astrometric telescope having a diameter as large as several meters.

[Others]

Note that the measurement head 110 in each of the aforementioned embodiments emits a spherical wave from the reference point F at one time. However, the measurement head 110 may be configured to emit a narrow light beam corresponding to a part of the spherical wave from the reference point F, so as to scan an incident region of the spherical wave on the surface 10 by that narrow light beam. With this configuration of the measurement head 110, since the detecting unit 208 detects test light reflected by only a narrow region on the surface 10, noise components included in the detection result can be reduced. Since only the narrow region is irradiated with all the light beam from the light source, a low-output light source can be used.

In each of the aforementioned embodiments, the measurement head measures the perpendicular distance q or unit normal vector ($\alpha$, $\beta$, $\gamma$). However, the measurement head may be configured to measure the perpendicular distance q and unit normal vector ($\alpha$, $\beta$, $\gamma$), and the shape of the surface to be measured may be obtained by substituting the perpendicular distance q and unit normal vector ($\alpha$, $\beta$, $\gamma$) measured by the measurement head in equation (3).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application Nos. 2009-229993 filed Oct. 1, 2009 and 2010-083402 filed Mar. 31, 2010, respectively, which are hereby incorporated by reference herein in their entirety.

What is claimed is:

1. An apparatus for measuring a shape of a surface to be measured, the apparatus comprising:
    a measurement head that measures at least one of a distance between a reference point and the surface or a direction of a normal from the surface to the reference point by emitting light that passes through the reference point from the measurement head, and detects test light that is reflected from the surface and returning to the measurement head through the reference point;
    a scanning mechanism that scans the measurement head to move the reference point; and
    a processor that:
        calculates the shape of the surface based on a measurement result obtained with the measurement head and coordinates of the reference point;
        calibrates the coordinates of the reference point using a measurement result obtained by measuring a first surface while scanning the measurement head along a scanning path; and
        calculates a shape of a second surface, which is different from the first surface, based on a measurement result obtained by measuring the second surface while scanning the measurement head along the same scanning path used for measuring the first surface, and the calibrated coordinates of the reference point.

2. The apparatus according to claim 1, wherein the measurement head measures the distance by emitting the light that passes through the reference point, and detects an interference wave generated by the test light that is reflected from the surface and returning to measurement head through the reference point, and reference light.

3. The apparatus according to claim 1, wherein the measurement head includes a light spot position sensor, and measures the direction by emitting the light through the reference point, and detecting a position where the test light reflected from the surface returns to the measurement head through the reference point enters the light spot position sensor.

4. The apparatus according to claim 1, wherein the scanning mechanism scans the measurement head so that the reference point moves along the scanning path.

5. The apparatus according to claim 4, wherein the processor calculates an offset value of the reference point with respect to the scanning path, which is generated when the scanning mechanism scans the measurement head so that the reference point moves along the scanning path, and determines the calibrated coordinates of the reference point by correcting coordinates of the scanning path by the offset value.

6. The apparatus according to claim 1, wherein the measurement head emits a spherical wave having the reference point as a center.

7. The apparatus according to claim 1, wherein the measurement head emits a light beam corresponding to a part of a spherical wave, so that the light beam passing through the reference point is reflected from the surface and returns to the measurement head through the reference point.

8. The apparatus according to claim 1, wherein the distance is absolutely measured using the measurement head.

9. A method of measuring a shape of a surface to be measured using a surface shape measurement apparatus, which comprises a measurement head that measures at least one of a distance between a reference point and the surface or a direction of a normal from the surface to the reference point by emitting light that passes through the reference point from the measurement head, and detecting test light that is reflected from the surface and returning to the measurement head through the reference point, the method comprising:

calibrating coordinates of the reference point based on a measurement result obtained by measuring a first surface using the measurement head while scanning the measurement head along a scanning path to move the reference point; and calculating a shape of a second surface, which is different from the first surface, based on a measurement result obtained by measuring the second surface using the measurement head while scanning the measurement head along the same scanning path used for measuring the first surface, and the calibrated coordinates of the reference point.

\* \* \* \* \*